(No Model.) 2 Sheets—Sheet 1.
J. T. CARTER.
MACHINE FOR MAKING BARREL HEADS.

No. 338,926. Patented Mar. 30, 1886.

Inventor
John T. Carter
by his Attorneys
Howson and Sons

Witnesses:
William D. Connor
William F. Davis (No Model.)
2 Sheets—Sheet 2.

J. T. CARTER.
MACHINE FOR MAKING BARREL HEADS.

No. 338,926.
Patented Mar. 30, 1886.

Witnesses:
William D. Conner
William F. Davis

Inventor:
John T. Carter
by his Attorneys
Howson and Son

UNITED STATES PATENT OFFICE.

JOHN T. CARTER, OF NORTH DANVILLE, VIRGINIA.

MACHINE FOR MAKING BARREL-HEADS.

SPECIFICATION forming part of Letters Patent No. 338,926, dated March 30, 1886.

Application filed February 1, 1886. Serial No. 190,407. (No model.)

*To all whom it may concern:*

Be it known that I, JOHN T. CARTER, a citizen of the United States, residing in North Danville, Pittsylvania county, Virginia, have invented certain Improvements in Machines for Cutting Heads for Hogsheads, Tierces, and Barrels, of which the following is a specification.

The object of my invention is to so construct a machine for sawing hogshead, tierce, and barrel heads as to permit the use of a small circular saw as the cutting-instrument, and to provide for the cutting of the heads from long boards or planks, the necessity of first cutting the boards or planks into lengths approximating to the diameter of the different portions of the head being unnecessary.

Figure 1:
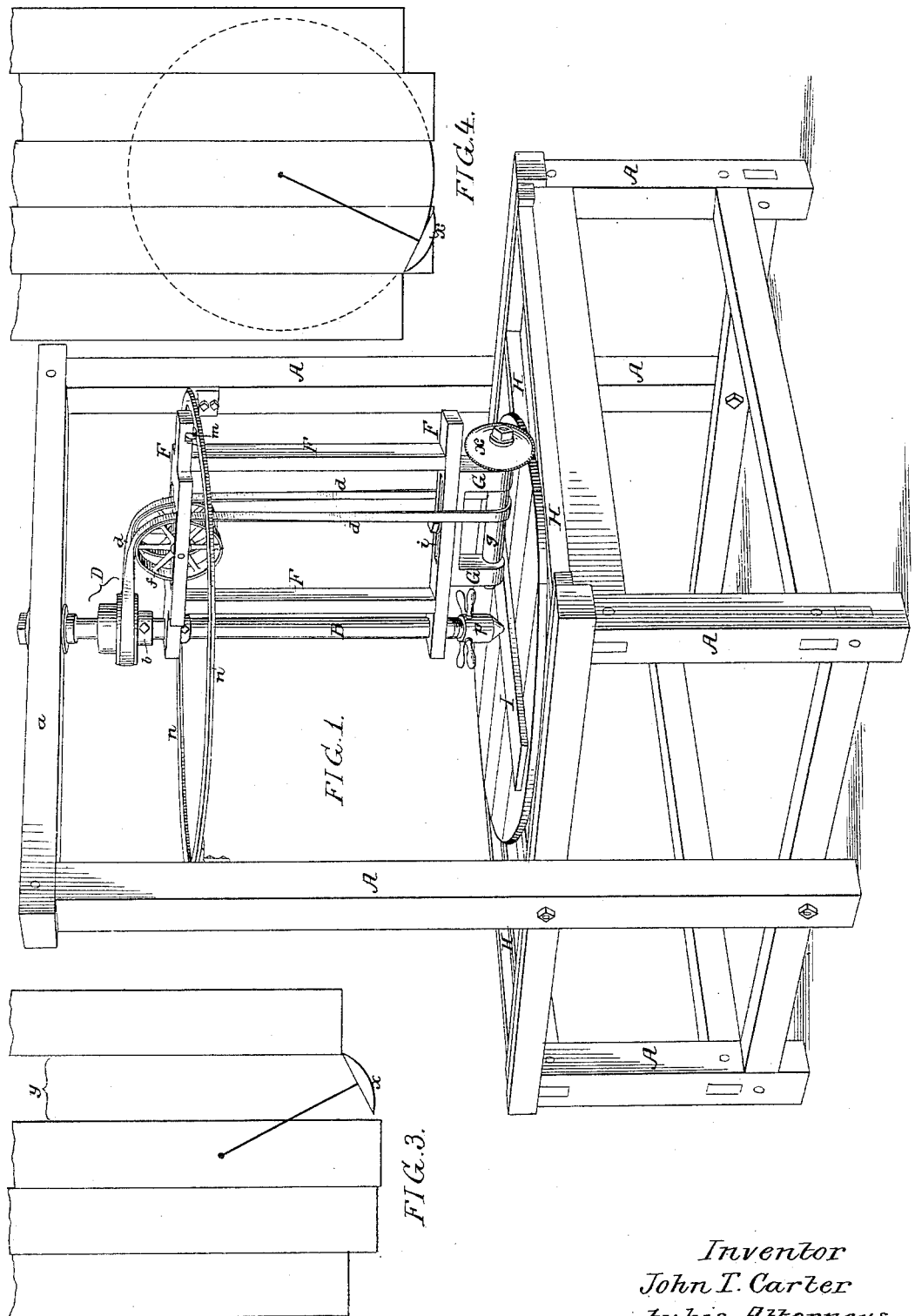
Figure 2:
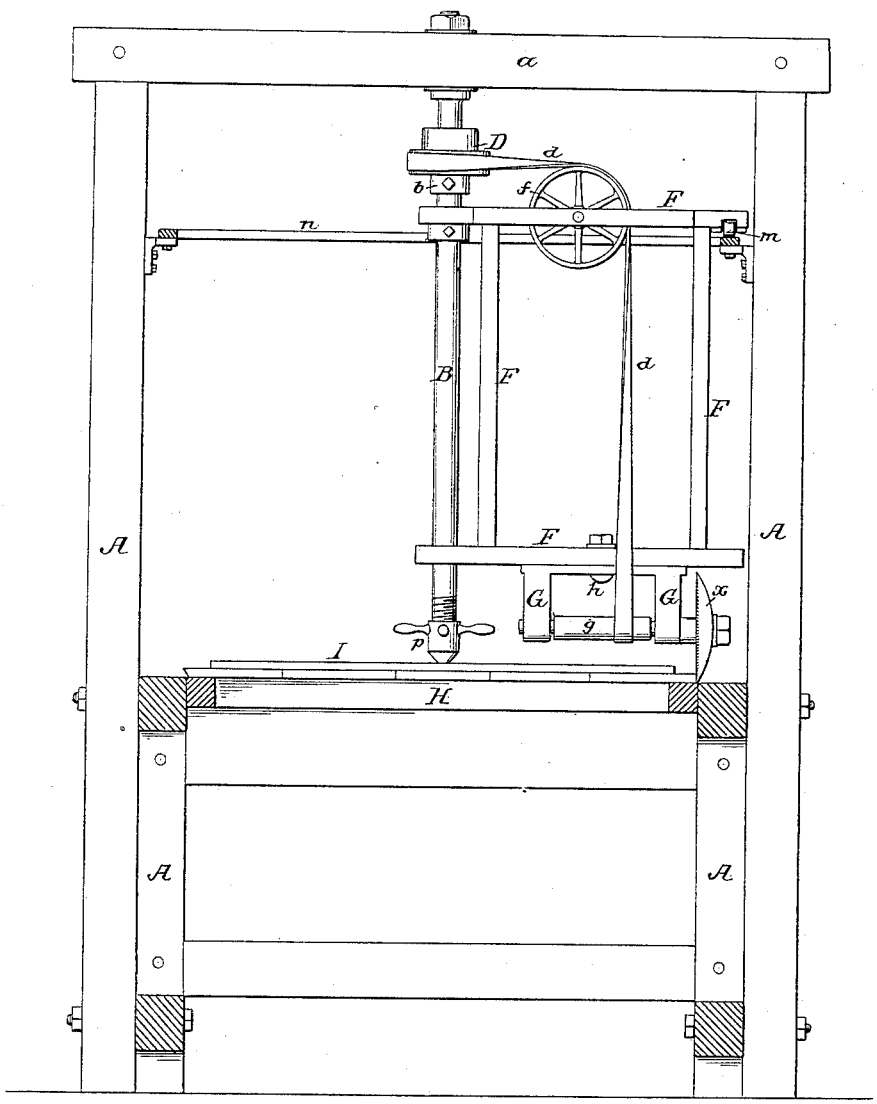

In the accompanying drawings, Figure 1 is a perspective view of a machine for cutting heads constructed in accordance with my invention. Fig. 2 is a side view of the same, partly in section; and Figs. 3 and 4 diagrams illustrating the operation of the machine.

A represents the frame of the machine, to the top bar, $a$, of which is properly secured a vertical spindle, B, this spindle having a collar, $b$, which serves as a support for a double pulley, D, one portion of this pulley receiving a driving-belt from any adjacent counter-shaft, the other portion receiving a belt, $d$, which passes around pulleys $f$, carried by a frame, F, hung to the vertical spindle B, said belt also passing around an elongated drum, $g$, on the saw-mandrel, which is adapted to suitable bearings in the frame G, carried by the frame F, but adjustable radially thereon, the frame being secured in position after adjustment by means of a securing-bolt, $h$, adapted to a slot, $i$, in the frame F. The upper bar of the frame F has at the outer end a supporting wheel or pulley, $m$, which travels upon an annular track, $n$, suitably supported upon brackets on the main frame A, the sagging of the outer portion of said frame F being thereby effectually prevented.

On the frame A of the machine is a bed, H, which serves as a support for the boards or planks from which the head is to be cut, these boards or planks being clamped to the bed by means of a transverse bar, I, which is acted upon by a handled nut, $p$, adapted to the threaded lower end of the spindle B. The saw $x$ is of the concave or dished form shown, in order that it will follow a circular cut without binding, and will form a proper bevel at the edge of the head.

In using the machine, the boards or planks from which the head is to be cut are adjusted as shown in Fig. 3, for instance, and clamped in position by means of the bar I and nut $p$, one of the boards being omitted so as to provide a starting-point for the saw. Motion being imparted to the saw, the frame F is swung on the axial spindle B, so as to cause the saw to cut into the board adjacent to the space $y$, Fig. 3, and as soon as the saw has traveled beyond the space the remaining board is introduced, as shown in Fig. 4, and the cutting of the head on the line indicated by the dotted line in said figure is proceeded with until the saw reaches its starting-point.

It will be observed that by my improved machine I am enabled to use an ordinary concave circular saw as the cutting-instrument, the head being cut from boards or planks of any desired length greater than the diameter of that portion of the head formed by them, no preliminary cutting of the planks into lengths approximating to that of the diameter of the different portions of the head being necessary.

I am aware that a circular saw has been used for cutting out barrel-heads, the blank consisting of short pieces held by a rotating clamp; and I am also aware that barrel-heads have been cut from planks by means of tools carried by a rotating cutter-head; but my invention is distinct from these, in that it permits the use of a circular saw for cutting the head from planks of any desired length.

I claim as my invention—

1. In a machine for sawing the heads of hogsheads, tierces, and other vessels, the combination of a fixed supporting-bed and means for clamping planks thereon with a frame carrying a circular saw and hung to a central axial spindle, so as to be free to rotate around the same, and with means for driving the said saw, all substantially as specified.

2. The combination of the frame and means for supporting and clamping planks thereon with the circular saw $x$, a frame carrying the same and hung to a central spindle, so as to be free to rotate around the same, and an annular track supporting the outer portion of said frame, all substantially as specified.

3. The combination of the frame A and means for supporting and clamping planks thereon, a frame, F, hung to a central spindle and free to rotate around the same, and a circular saw, the mandrel of which is carried by a frame adjustable radially on said swinging frame, all substantially as specified.

4. The combination of the frame A and means for supporting and clamping planks thereon, the frame F, hung to a central spindle and free to rotate around said spindle, a driving-pulley on said central spindle, a saw, the mandrel of which has a belt-drum, and a belt adapted to the driving-pulley and to said drum and passing around supporting-pulleys on said frame F, all substantially as specified.

5. The combination of the frame A and its supporting-bed H, the clamping-bar I, the central spindle, B, having a clamping-nut at the lower end, and the frame F, hung to and free to rotate around the spindle B and carrying a circular saw, all substantially as specified.

In testimony whereof I have signed my name to this specification in the presence of two subscribing witnesses.

JOHN T. CARTER.

Witnesses:
M. H. JENNINGS,
R. R. TAYLOR.